US012679316B2

(12) United States Patent
Lim

(10) Patent No.: US 12,679,316 B2
(45) Date of Patent: Jul. 14, 2026

(54) ELECTRO-MECHANICAL BRAKE AND CONTROL METHOD THEREFOR

(71) Applicant: HYUNDAI MOBIS CO., LTD., Seoul (KR)

(72) Inventor: Dong Hwan Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 13 days.

(21) Appl. No.: 18/627,509

(22) Filed: Apr. 5, 2024

(65) Prior Publication Data

US 2025/0010825 A1 Jan. 9, 2025

(30) Foreign Application Priority Data

Jul. 4, 2023 (KR) ........................ 10-2023-0086555

(51) Int. Cl.
| | |
|---|---|
| *B60T 8/172* | (2006.01) |
| *B60T 8/171* | (2006.01) |
| *B60T 13/74* | (2006.01) |
| *B60T 17/18* | (2006.01) |

(52) U.S. Cl.
CPC .............. *B60T 8/172* (2013.01); *B60T 8/171* (2013.01); *B60T 13/74* (2013.01); *B60T 17/18* (2013.01)

(58) Field of Classification Search
CPC .......... B60T 8/172; B60T 8/171; B60T 13/74; B60T 17/18
USPC .......................................................... 701/70
See application file for complete search history.

(56) References Cited

U.S. PATENT DOCUMENTS

| | | | | |
|---|---|---|---|---|
| 6,270,172 B1* | 8/2001 | Shirai | ................... | B60T 8/3255 |
| | | | | 303/112 |
| 8,430,213 B2* | 4/2013 | Yokoyama | .............. | F16D 65/18 |
| | | | | 188/71.7 |
| 11,685,345 B2* | 6/2023 | Hesseler | ................. | B60T 8/172 |
| | | | | 701/70 |
| 2003/0020327 A1* | 1/2003 | Isono | .................... | B60T 8/4018 |
| | | | | 303/113.4 |
| 2006/0169554 A1* | 8/2006 | Baudendistel | ...... | F16D 65/0012 |
| | | | | 267/140.14 |
| 2006/0290201 A1* | 12/2006 | Kawahara | ............... | F16D 65/18 |
| | | | | 303/162 |
| 2007/0062764 A1* | 3/2007 | Takahashi | ............... | F16D 65/18 |
| | | | | 188/1.11 R |
| 2007/0126281 A1* | 6/2007 | Zumberge | ............. | B60T 13/741 |
| | | | | 303/3 |
| 2009/0218179 A1* | 9/2009 | Yokoyama | .............. | F16D 65/18 |
| | | | | 188/1.11 L |

(Continued)

*Primary Examiner* — Logan M Kraft
*Assistant Examiner* — John D Bailey
(74) *Attorney, Agent, or Firm* — NovoTechIP International PLLC

(57) ABSTRACT

An electro-mechanical brake including: a wheel disc; a brake pad configured to press the wheel disc; a piston configured to press the brake pad; a motor configured to move the piston forward or backward when a current is applied; and a control unit configured to apply a current to the motor, detect a contact point on the basis of a position of the piston when forward movement of the piston due to the current ends, and estimate braking force corresponding to the position of the piston on the basis of the position of the piston, wherein the contact point is a position of the piston when the piston starts to move forward due to the motor and the piston and the brake pad start to come into contact with each other.

9 Claims, 9 Drawing Sheets

(56)     References Cited

U.S. PATENT DOCUMENTS

| | | | | | |
|---|---|---|---|---|---|
| 2009/0255769 | A1* | 10/2009 | Kurita | | F16D 65/18 |
| | | | | | 188/370 |
| 2011/0246039 | A1* | 10/2011 | Takeda | | F16D 65/18 |
| | | | | | 701/70 |
| 2012/0193177 | A1* | 8/2012 | Goto | | F16D 65/18 |
| | | | | | 188/161 |
| 2013/0197771 | A1* | 8/2013 | Takeda | | B60T 13/745 |
| | | | | | 701/70 |
| 2015/0175137 | A1* | 6/2015 | Murata | | B60T 7/042 |
| | | | | | 701/70 |
| 2017/0276199 | A1* | 9/2017 | Yabusaki | | F16D 66/026 |
| 2017/0291585 | A1* | 10/2017 | Kobune | | F16D 55/226 |
| 2018/0072285 | A1* | 3/2018 | Tanaka | | F16D 55/226 |
| 2018/0162333 | A1* | 6/2018 | Nakaoka | | F16D 65/18 |
| 2018/0236991 | A1* | 8/2018 | Tada | | F16D 65/18 |
| 2019/0241168 | A1* | 8/2019 | Tada | | H02P 3/04 |
| 2019/0293134 | A1* | 9/2019 | Nanahara | | F16D 65/18 |
| 2019/0337498 | A1* | 11/2019 | Jung | | B60T 13/745 |
| 2019/0359195 | A1* | 11/2019 | Okada | | B60T 13/741 |
| 2020/0130657 | A1* | 4/2020 | Isobe | | H02P 29/00 |
| 2021/0001830 | A1* | 1/2021 | Uraoka | | B60T 13/74 |
| 2022/0032886 | A1* | 2/2022 | Goto | | F16D 65/183 |
| 2022/0111824 | A1* | 4/2022 | Kim | | B60T 7/042 |
| 2022/0355771 | A1* | 11/2022 | Fujita | | B60T 17/22 |
| 2023/0020123 | A1* | 1/2023 | Hirata | | B60T 8/175 |
| 2023/0042441 | A1* | 2/2023 | Fujita | | F16D 65/183 |
| 2023/0070909 | A1* | 3/2023 | Takimoto | | F16D 65/183 |
| 2023/0092049 | A1* | 3/2023 | Kim | | B60T 13/745 |
| | | | | | 701/70 |
| 2023/0271596 | A1* | 8/2023 | Jung | | F16D 65/183 |
| 2023/0406281 | A1* | 12/2023 | LeVesque | | B60T 17/22 |
| 2024/0010174 | A1* | 1/2024 | Kim | | B60T 8/172 |

* cited by examiner

ELECTRO-MECHANICAL BRAKE AND CONTROL METHOD THEREFOR

CROSS-REFERENCE TO RELATED APPLICATIONS

The present application claims priority to Patent Application No. 10-2023-0086555, filed on Jul. 4, 2023 in Korea, the entire contents of which are incorporated herein by reference.

TECHNICAL FIELD

The present disclosure relates to an electro-mechanical brake and a control method therefor.

BACKGROUND

The content described in this section simply provides background information for the present disclosure and does not constitute related art.

An electro-mechanical brake (EMB) of the related art measures braking force using a braking force sensor and controls the braking force. The braking force sensor mounted on the electro-mechanical brake is very expensive. In addition, the braking force sensor has a disadvantage that the braking force sensor does not accurately measure the braking force depending on a mounting position of the braking force sensor. To overcome such disadvantages, a force sensorless system is used.

The force sensorless system is a system that estimates braking force without using a braking force sensor. An electro-mechanical brake using the force sensorless system performs calibration when a driver opens a door of a vehicle or starts up the vehicle. Here, the calibration refers to a process of setting an electro-mechanical brake. Since a state of the electro-mechanical brake such as wearing of a brake pad changes with use, the calibration must be performed each time the vehicle is used.

As the calibration, a contact point between a piston and the brake pad may be detected or stiffness correction for the brake pad may be performed. It is important to end the calibration quickly. This is because the driver can travel after the calibration is completed.

The brake pad wears and stiffness of the brake pad changes due to use. In the case of a force sensorless system, it is difficult to estimate braking force when the brake pad wears. Generation of the braking force corresponding to demanded braking force of the driver is directly related to safety of the driver. In an electro-mechanical brake using the force sensorless system, a method capable of accurately estimating the braking force is required.

SUMMARY

Accordingly, the present disclosure is intended to solve these problems, and a main object of the present disclosure is to provide an electro-mechanical brake capable of accurately estimating braking force without a braking force sensor.

Further, another main object of the present disclosure is to provide an electro-mechanical brake capable of quickly detecting a contact point between a piston and a brake pad and correcting the stiffness of the brake pad.

As described above, according to the present embodiment, the electro-mechanical brake has an effect that the electro-mechanical brake can accurately estimate the braking force without the braking force sensor.

Further, the electro-mechanical brake has an effect that the electro-mechanical brake can quickly detect a contact point between the piston and the brake pad and correct the stiffness of the brake pad.

DETAILED DESCRIPTION

Figure 1:
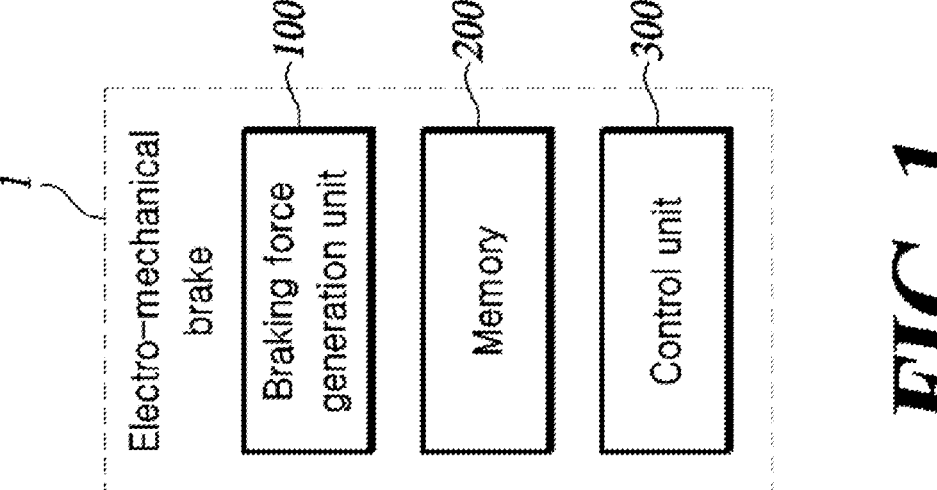
FIG. 1 is a diagram illustrating a functional block diagram of an electro-mechanical brake according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a diagram illustrating a functional block diagram of an electro-mechanical brake according to an embodiment of the present disclosure.

Figure 2:
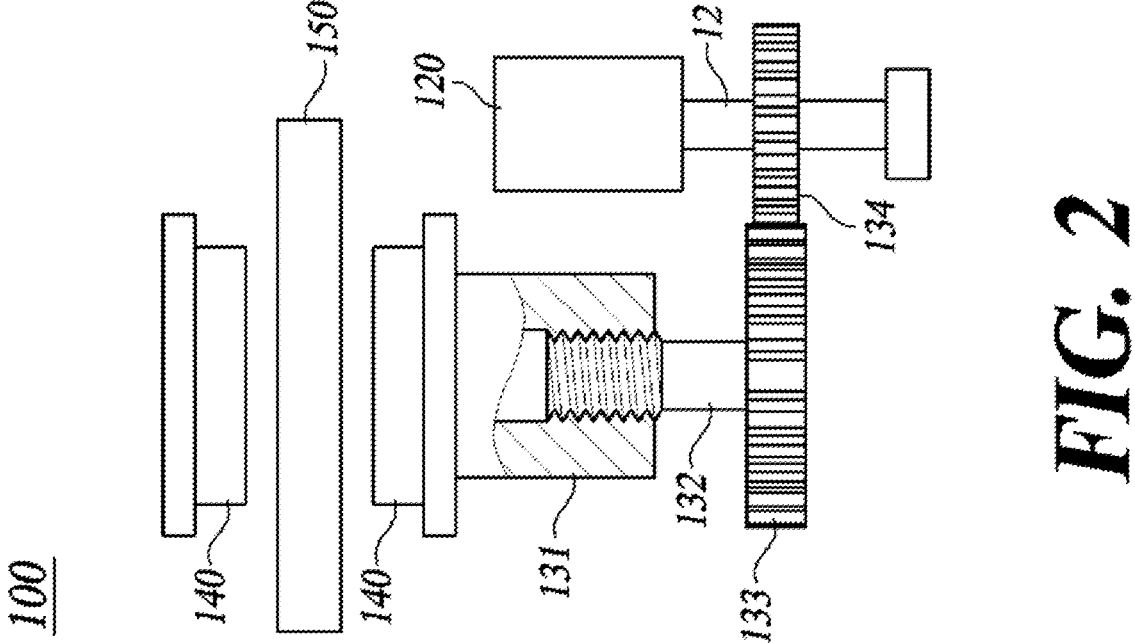
FIG. 2 is a diagram illustrating a braking force generation unit of the electro-mechanical brake according to an embodiment of the present disclosure.

FIG. 2 is a diagram illustrating a braking force generation unit of an electro-mechanical brake according to an embodiment of the present disclosure.

Referring to FIGS. 1 and 2, an electro-mechanical brake (EMB) 1 includes all or some of a braking force generation unit 100, a memory 200, and a control unit 300. The electro-mechanical brake 1 is a brake apparatus that generates friction braking force. The electro-mechanical brake 1 has a faster response speed and is more environmentally friendly than a hydraulic brake (not illustrated) since hydraulic pressure is not used.

A condition in which a brake pad 140 of the electro-mechanical brake 1 is a full pad, a contact point CP is a preset position, and stiffness of the brake pad 140 has a preset value is defined as a standard condition. The standard condition may vary depending on a specification of the electro-mechanical brake 1. Here, the full pad means a condition in which the brake pad 140 does not wear. The contact point CP will be described below.

Both or one of a first force map F1 and a second force map F2 is stored in the memory. The force map is a map in which a correlation between a position of a piston 131 and the braking force is indexed. When the electro-mechanical brake 1 is in the standard condition, a relationship between the position of the piston 131 and the braking force may be ascertained on the basis of the first force map F1. Here, the first force map F1 refers to a force map when the electro-mechanical brake 1 is in the standard condition. The first force map F1 may be used as redundancy when the electro-mechanical brake 1 fails to generate the second force map F2.

The electro-mechanical brake 1 changes from the standard condition depending on use. For example, the brake pad 140 may wear and change a physical property thereof. In other words, the stiffness can change. Since the first force map F1 is a map to be applied when the electro-mechanical brake 1 is in the standard condition, the second force map F2 that is a new force map must be created when the electro-mechanical brake 1 changes from the standard condition.

According to an embodiment, the electro-mechanical brake 1 can estimate the braking force. According to an embodiment, when a condition of the electro-mechanical brake 1 change from the standard condition, the second force map F2 may be generated. The electro-mechanical brake 1 may estimate braking force on the basis of the second force map F2. Here, the second force map F2 is a force map applied to a present condition of the electro-mechanical brake 1.

The braking force generation unit 100 includes all or some of a motor 120, a rotation shaft 121, the piston 131, a screw shaft 132, a driven gear 133, and a driving gear 134, the brake pad 140, a wheel disc 150, and a piston position sensor (not illustrated).

The braking force generation unit 100 generates friction braking force on the basis of an amount of stroke of a driver when the driver steps on a brake pedal (not illustrated). Specifically, when the motor 120 rotates, the rotation shaft 121 and the driving gear 134 rotate together. The driving gear 134 transmits power to the driven gear 133. The driven gear 133 and the screw shaft 132 rotate together due to the driving gear 134. The piston 131 is screw-coupled to the screw shaft 132. When the screw shaft 132 rotates, screw coupling is connected or disconnected, and the piston 131 moves forward or backward. When the piston 131 moves forward, the piston 131 presses the brake pad 140. The brake pad 140 brakes the vehicle by pressing the rotating wheel disc 150. The wheel disc 150 is coupled to a vehicle wheel (not illustrated) and rotated with the wheel.

The control unit 300 detects the contact point CP. Here, the contact point CP is a position of the piston 131 when the piston 131 starts to move forward due to the motor 120 and the piston 131 comes into contact with the brake pad 140. Since the brake pad 140 wears due to use, a position of the contact point CP changes. In the case of a force sensorless system, the contact point CP must be accurately detected so that the braking force corresponding to the position of the piston 131 can be estimated. That is, the control unit 300 may detect the contact point CP of the present condition.

The control unit 300 estimates the braking force corresponding to the position of the piston 131 or a moving distance of the piston 131. A physical property of the brake pad 140 changes due to wearing, temperature, or the like thereof. That is, the stiffness of the brake pad 140 changes. The control unit 300 detects change in rigidity and estimates the braking force corresponding to the position of the piston 131 or the moving distance of the piston 131. That is, the control unit 300 can estimate the braking force in the present condition.

Figure 3:
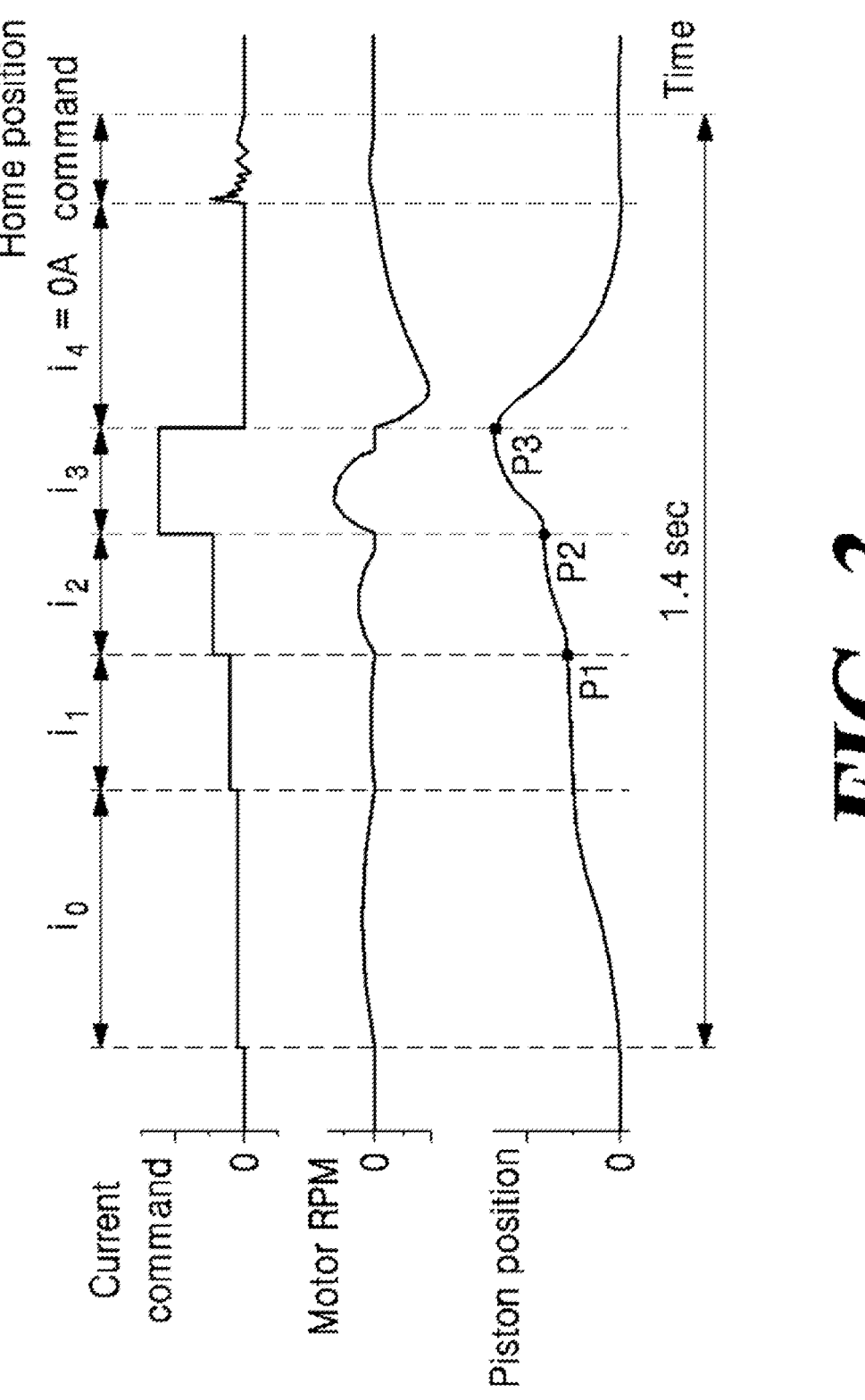
FIG. 3 is a graph showing a method of directly applying a current command to a motor of the electro-mechanical brake according to an embodiment of the present disclosure.

FIG. 3 is a graph showing a process of applying the current command to a motor of the electro-mechanical brake according to an embodiment of the present disclosure.

Figure 4:
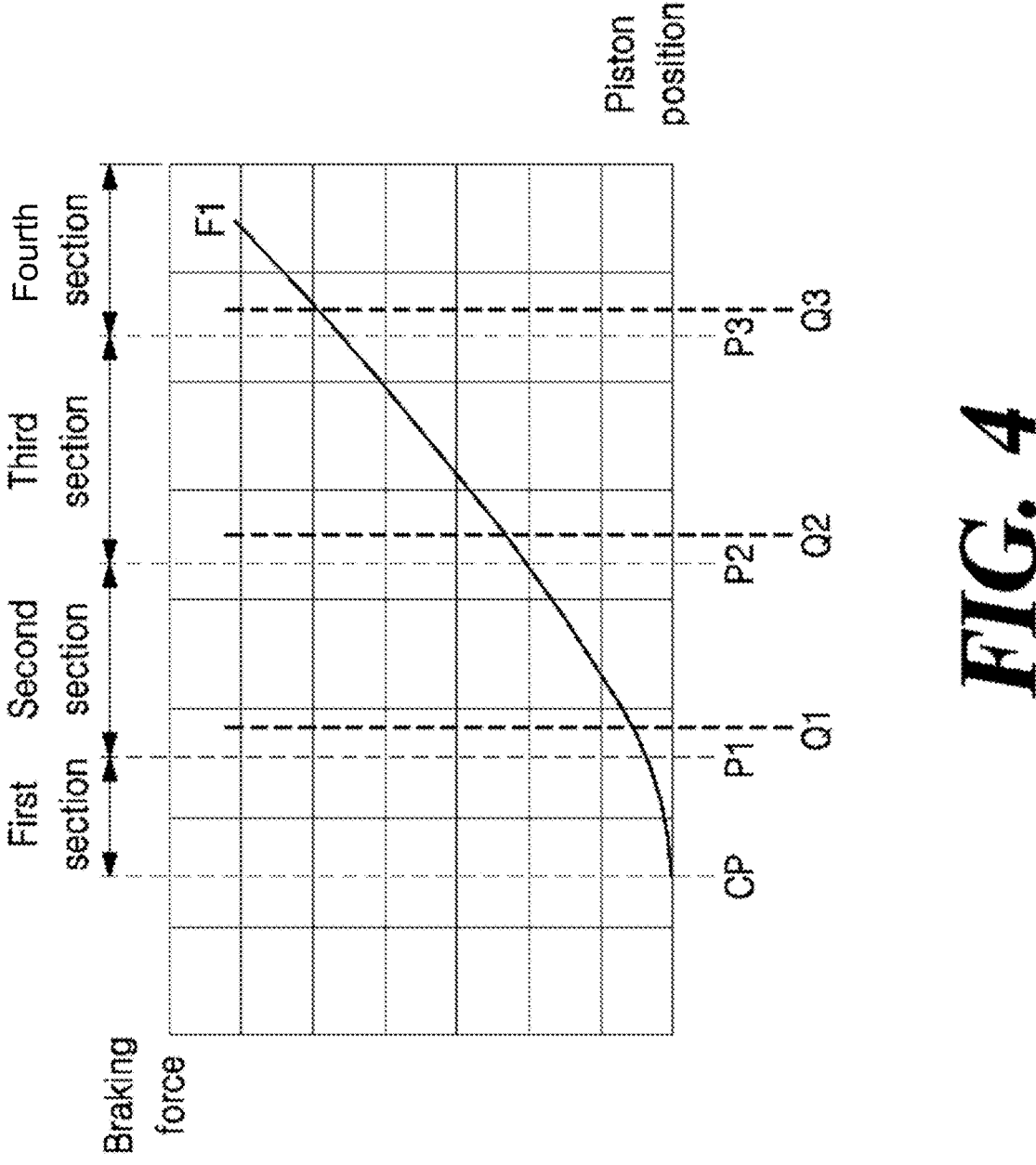
FIG. 4 is a graph showing a braking diagram using a first force map of the electro-mechanical brake according to an embodiment of the present disclosure.

FIG. 4 is a graph showing a braking diagram using the first force map of the electro-mechanical brake according to an embodiment of the present disclosure.

Figure 5:
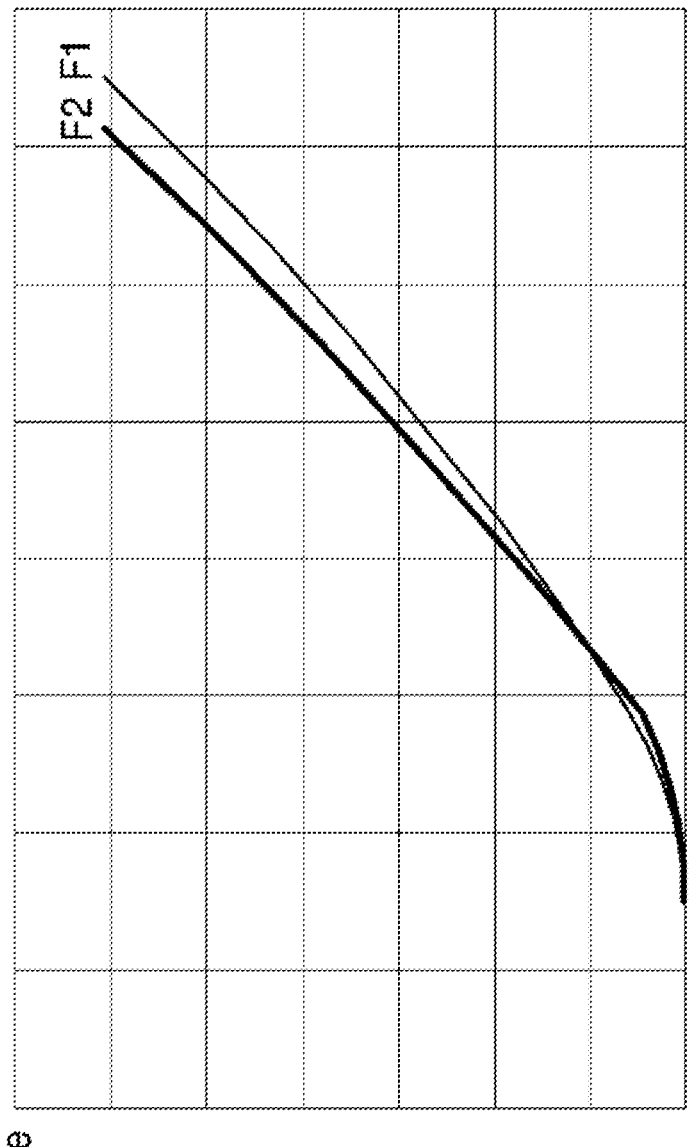
FIG. 5 is a graph showing a braking diagram using the first force map and a second force map of the electro-mechanical brake according to an embodiment of the present disclosure.

FIG. 5 is a graph showing a braking diagram using the first force map and the second force map of the electro-mechanical brake according to an embodiment of the present disclosure.

Referring to FIGS. 3 to 5, the control unit 300 of the electro-mechanical brake 1 according to the present disclosure detects the contact point CP and directly applies the current command to the motor 120 to estimate the braking force. The electro-mechanical brake 1 according to an embodiment may detect the contact point CP on the basis of a position at which the piston 131 stops and estimate the braking force.

When the current command is applied to the motor 120 by the control unit 300, the piston 131 moves forward. The piston 131 moves forward and comes into contact with the brake pad 140. The piston 131 does not stop at the contact point CP, but moves forward until the sum of forces acting on the piston 131 acting on the piston 131 becomes zero. Specifically, force with which the piston 131 presses the brake pad 140 is proportional to the current applied to the motor 120. When the force with which the piston 131 presses the brake pad 140 and a reaction force with which the brake pad 140 pushes the piston 131 are balanced, the piston 131 stops. When the piston 131 stops, the motor 120 also stops rotating.

When the piston 131 and the brake pad 140 are spaced apart from each other, the control unit 300 applies a contact current $i_0$ to the motor 120. Here, the contact current $i_0$ refers to a current applied to the motor 120 in order to bring the piston 131 into contact with the brake pad 140. When the contact current $i_0$ is applied to the motor 120, the piston 131 moves forward and comes into contact with the brake pad 140. The piston 131 does not stop after coming into contact with the brake pad 140, but moves forward until the sum of forces becomes zero. When the contact current $i_0$ having a smaller value is applied, the piston 131 stops at a position closer to the contact point CP. The purpose of the process of applying the contact current $i_0$ is to move the piston 131 as close as possible to the contact point CP. When the position at which the piston stops is closer to the contact point CP, an estimation value of the braking force becomes more accurate. It is preferable to apply the contact current $i_0$ having a relatively small value so that the piston 131 stops at a position as close as possible to the contact point CP. When a current having a greater value is applied to the motor 120, the force with which the piston 131 pushes the brake pad 140 becomes stronger. That is, when the current having a greater value is applied, the piston 131 stops at a point further away from the contact point CP.

According to an embodiment, the contact current may be a current when the piston 131 further moves forward a certain distance from a position at which the piston 131 comes into contact with the brake pad 140 regardless of an initial position of the piston 131 and then stops.

When the reaction force of the brake pad 140 increases and the rotation of the motor 120 due to the contact current $i_0$ stops, the control unit 300 applies a first current $i_1$ to the motor 120. Here, the first current $i_1$ is higher than the contact current $i_0$. Due to the first current $i_1$, the motor 120 starts to rotate, and the stopped piston 131 starts to move forward again. The piston 131 that is moving forward stops when the sum of forces acting on the piston 131 becomes zero. When the piston 131 stops, the piston position sensor detects the first position P1. The first position P1 is a position of the piston 131 when the rotation of the motor 120 to which the first current $i_1$ is applied stops.

According to an embodiment, the control unit 300 may detect a first estimated position on the basis of the first position P1. The first estimated position is a position of the piston 131 when the piston 131 moves backward by a preset distance from the first position P1. Here, the preset distance may be a value derived through an experiment. The preset distance may vary depending on the specification of the electro-mechanical brake 1.

When the rotation of the motor 120 due to the first current $i_1$ stops, the control unit 300 applies ac second current $i_2$ to the motor 120. Here, the second current $i_2$ is higher than the first current $i_1$. Due to the second current $i_2$, the motor 120 starts to rotate, and the stopped piston 131 starts to move forward again. The piston 131 that is moving forward stops when the sum of forces acting on the piston 131 becomes zero. When the piston 131 stops, the piston position sensor detects a second position P2. The second position P2 is a position of the piston 131 when the rotation of the motor 120 to which the second current $i_2$ is applied stops.

According to an embodiment, the control unit 300 may detect a second estimated position on the basis of the second position P2. The second estimated position is a position of the piston 131 when the piston 131 moves backward by a preset distance from the second position P2. Here, the preset distance may be a value derived through an experiment. The preset distance may vary depending on the specification of the electro-mechanical brake.

According to an embodiment, the control unit 300 may detect the contact point CP on the basis of the first position P1 and the second position P2. According to an embodiment, the contact point CP may be an average value of the first estimated position and the second estimated position.

When the stiffness of the brake pad 140 does not change from the standard condition, the electro-mechanical brake 1 may estimate the braking force on the basis of the first force map F1 and the detected contact point CP.

When the stiffness of the brake pad 140 changes, the electro-mechanical brake 1 according to the present disclosure estimates the braking force in consideration of change in stiffness. A specific method of estimating the braking force in consideration of change in stiffness will be described below.

When the rotation of the motor 120 due to the second current $i_2$ stops, the control unit 300 applies a third current $i_3$ to the motor 120. Here, the third current $i_3$ is higher than the second current $i_2$. Due to the third current $i_3$, the motor 120 starts to rotate, and the stopped piston 131 starts to move forward again. The piston 131 that is moving forward stops when the sum of forces acting on the piston 131 acting on the piston 131 becomes zero. When the piston 131 stops, the piston position sensor detects the third position P3. The third position P3 is a position of the piston 131 when the rotation of the motor 120 to which the third current $i_3$ is applied stops.

According to an embodiment, the control unit 300 may estimate the braking force on the basis of the first to third positions P1 to P3. The control unit 300 may generate the second force map F2 on the basis of the first to third positions P1 to P3.

Each of Q1 to Q3 illustrated in FIG. 4 is a value detected by applying the first current in to the third current $i_3$ to the motor 120 in the standard condition. Specifically, Q1 to Q3 are positions of the piston 131 when the rotation of the motor 120 stops.

According to an embodiment, the control unit 300 may determine whether the stiffness of the brake pad 140 changes on the basis of the first to third positions P1 to P3. That is, the control unit 300 may determine whether the stiffness has changed by comparing stop positions of the piston 131 in the standard condition and the present condition. Specifically, a determination may be made whether the stiffness of the brake pad 140 changes through a comparison between the first to third positions P1 to P3 and Q1 to Q3. For example, a determination may be made that, when a difference between the first position P1 and Q1 is greater, the change in stiffness is greater. The first to third positions P1 to P3 are not limited to the positions illustrated in FIG. 4. The first to third positions P1 to P3 may change depending on the present condition of the electro-mechanical brake 1.

The control unit 300 may generate the second force map F2 on the basis of the first position P1, the second position P2, the third position P3, and the first force map F1. Here, the second force map F2 refers to a map obtained by correcting the first force map F1 on the basis of the change in stiffness of the brake pad 140. The control unit 300 may estimate the braking force on the basis of the second force map F2. The second force map F2 may reflect the present condition of the electro-mechanical brake 1. Using the second force map F2, the braking force value for the position of the piston 131 can be quickly output.

According to an embodiment, the control unit 300 may calculate a weight (W) to correct the stiffness of the brake pad 140. The weight may be calculated on the basis of the first to third positions P1 to P3. The weight may vary depending on the position of the contact point CP, the wearing state of the brake pad 140, the temperature of the brake pad 140, the specification of the electro-mechanical brake 1, or the like.

The control unit 300 may set a plurality of sections corresponding to the position of the piston 131 and calculate a weight corresponding to each section. A first section is a section from the contact point CP detected by the control unit 300 to the first position P1. A second section is a section from the first position P1 to the second position P2. A third section is a section from the second position P2 to the third position P3. A fourth section is a section after the third position P3.

According to an embodiment, weights of the first to fourth sections may be derived by using Equation 1 to Equation 4.

$$W1 = Q1 = P1 - Ref1 - CP \qquad \text{[Equation 1]}$$

W1 is the weight of the first section. Q1 is a position at which the forward movement of the piston 131 stops when the first current $i_1$ is applied in the standard condition. P1 is a position of the piston 131 when the rotation of the motor 120 to which the first current $i_1$ is applied stops. REF1 is a preset value and may be determined experimentally. A value of may vary depending on the specification of the electro-mechanical brake 1. CP denotes the contact point.

$$W2 = Q2 + P2 - Ref2 - P1 \qquad \text{[Equation 2]}$$

W2 is the weight of the second section. Q2 is a position at which the forward movement of the piston 131 stops when the second current $i_2$ is applied in the standard condition. P2 is a position of the piston 131 when the rotation of the motor 120 to which the second current $i_2$ is applied stops. Ref2 is a preset value and may be determined experimentally. A value of Ref2 may vary depending on the specification of the electro-mechanical brake 1. P1 is a position of the piston 131 when the rotation of the motor 120 to which the first current $i_1$ is applied stops.

$$W3 = Q3 + P3 - Ref3 - P2 \qquad \text{[Equation 3]}$$

W3 is the weight of the third section. Q3 is a position at which the forward movement of the piston 131 stops when the third current $i_3$ is applied in the standard condition. P3 is a position of the piston 131 when the rotation of the motor 120 to which the third current $i_3$ is applied stops. Ref3 is a preset value and may be determined experimentally. A value of Ref3 may vary depending on the specification of the electro-mechanical brake 1. P2 is a position of the piston 131 when the rotation of the motor 120 to which the second current $i_2$ is applied stops.

$$W4 = W3 \qquad \text{[Equation 4]}$$

W4 is the weight of the fourth section. W3 is the weight of the third section. In the fourth unit, the same weight as that of the third section is applied.

Figure 6:
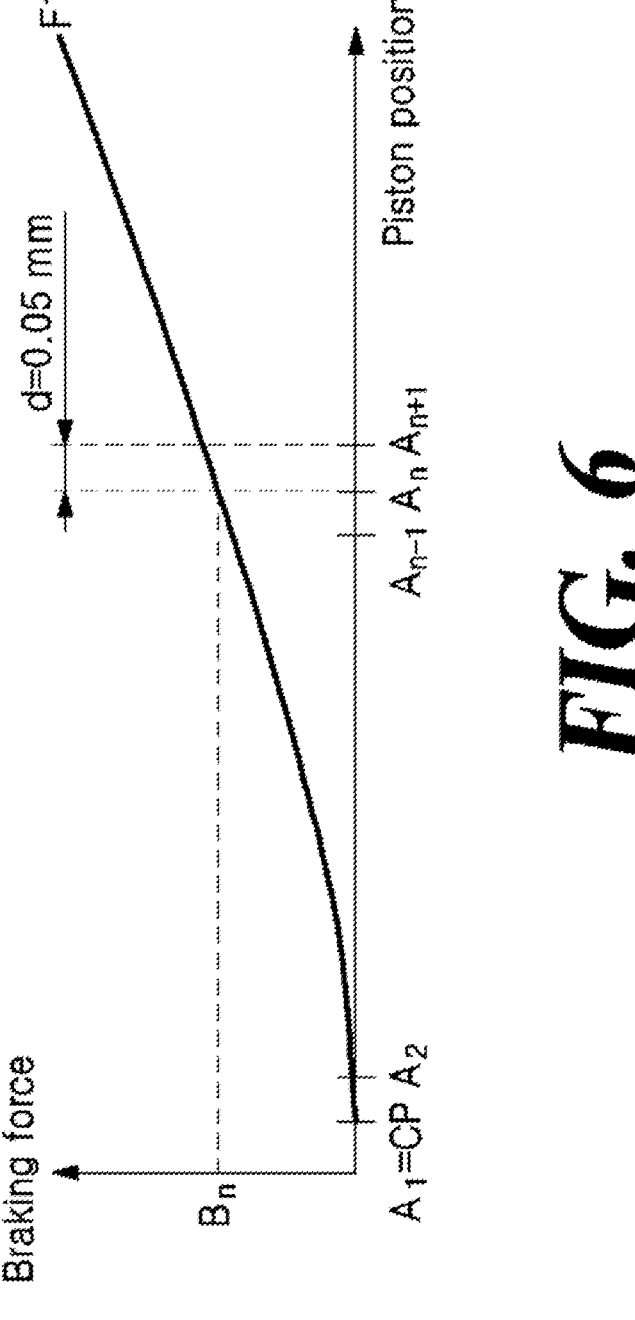
FIG. 6 is a graph showing an arbitrary scale value $A_n$ on an x-axis of the first force map according to an embodiment of the present disclosure.

FIG. 6 is a graph showing an arbitrary scale value $A_n$ on an x-axis of the first force map according to an embodiment of the present disclosure.

Figure 7:
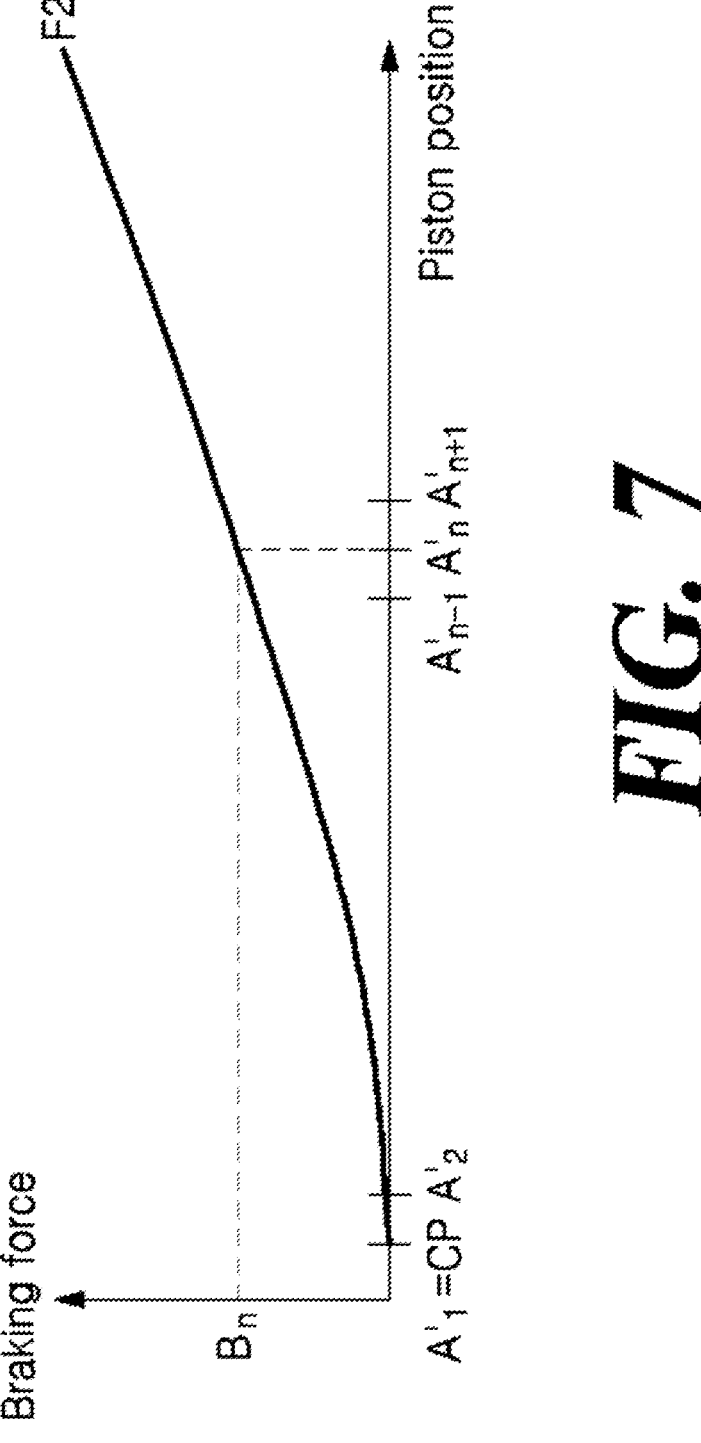
FIG. 7 is a graph showing an arbitrary scale value $A'_n$ on an x-axis of the second force map according to an embodiment of the present disclosure.

FIG. 7 is a graph showing an arbitrary scale value $A'_n$ on an x-axis of the second force map according to an embodiment of the present disclosure.

Referring to FIGS. 3 to 7, the control unit 300 may generate the second force map F2 on the basis of first to fourth weights. According to an embodiment, the number of scales on the x-axis of the first force map F1 and the second force map F2 may be a specific number. The number of scales in each of the first force map F1 or the second force map F2 may vary depending on the specification of the electro-mechanical brake 1.

$A_n$ and $A'_n$ are arbitrary scale values on the x-axis, but denote the positions of the piston 131 that outputs the same braking force $B_n$. Here, $A_n$ is a position of the piston 131 on the first force map F1, and $A'_n$ is a position of the piston 131 on the second force map F2. Since the first force map F1 is in the standard condition and the second force map F2 is in the present condition, the positions of the piston 131 for outputting the same braking force are different ($A_n \neq A'_n$).

The control unit 300 may generate the second force map F2 on the basis of the first to fourth weights. Each scale value of the x-axis of the second force map F2 may be expressed as $A'_n$ or the like. The control unit 300 corrects a value of $A_n$ to generate a value of $A'_n$. Similarly, the control unit 300 corrects a value of $A_{n+1}$ to generate a value of $A'_{n+1}$. Intervals between the respective scales on the x-axis of the first force map F1 are all the same. For example, an interval between $A_{n-1}$ and $A_n$ is the same as an interval between $A_n$ and $A_{n+1}$. According to an embodiment, an interval between the respective scales of the first force map F1 may be 0.05 mm.

In the case of the second force map F2, since each scale value $A'_n$ is defined as Equation 5, an interval between the respective scales is not constant. For example, an interval between $A'_{n-1}$ and $A'_n$ may be different from an interval between $A'_n$ and $A'_{n+1}$.

$$A'_n = A'_{n-1} + \frac{W_m}{S_m} \qquad \text{[Equation 5]}$$

n is a natural number equal to or greater than 2. $A'_n$ is a scale value of the second force map F2. According to an embodiment, A1 may be equal to a value of the contact point CP. Wm denotes the weights of the first to fourth sections. Sm denotes the number of scale arrangements in the first to fourth sections. m has a value of 1 to 4. The number of scale arrangements may be the number of scales on the x-axis included in each section. The number of scale arrangements is derived by using Equation 6.

$$S_m = \frac{L_m}{d} + 1 \qquad \text{[Equation 6]}$$

d denotes an interval between the scales on the x-axis of the first force map F1. According to an embodiment, d may be 0.05 mm. A value of d is not limited by FIG. 6. Lm denotes a length of each section. For example, Li is a length of the first section. The number of scale arrangements is proportional to a length of each of the first to fourth sections of the first force map F1. According to an embodiment, the second force map F2 may be generated on the basis of $A'_n$ derived by Equation 6.

When the rotation of the motor 120 due to the third current $i_3$ stops, the control unit 300 applies a fourth current $i_4$ to the motor 120. The fourth current $i_4$ may be lower than the first current $i_1$. When the fourth current $i_4$ is applied to the motor 120, the piston 131 moves backward due to the reaction force of the brake pad 140. According to an embodiment, the fourth current $i_4$ may be 0 A. When 0 A is applied to the motor 120, a thrust caused by the motor 120 acting on the piston 131 is eliminated. Eventually, the piston 131 starts to move backward due to the reaction force of the brake pad 140.

When the rotation of the motor 120 due to the fourth current $i_4$ stops, the control unit 300 applies a position control command to move the piston 131. Here, the position control command is a command to move the piston 131 so that the piston 131 and the brake pad 140 have a preset separation distance. According to an embodiment, the piston 131 may be located at a home position using the position control command. The home position is a position of the piston 131 when the electro-mechanical brake 1 is in an inactive state. According to an embodiment, the electro-mechanical brake 1 may set the home position at a position spaced apart from the contact point CP by a preset distance. The home position may vary depending on the present condition and the specification of the electro-mechanical brake 1.

Figure 8:
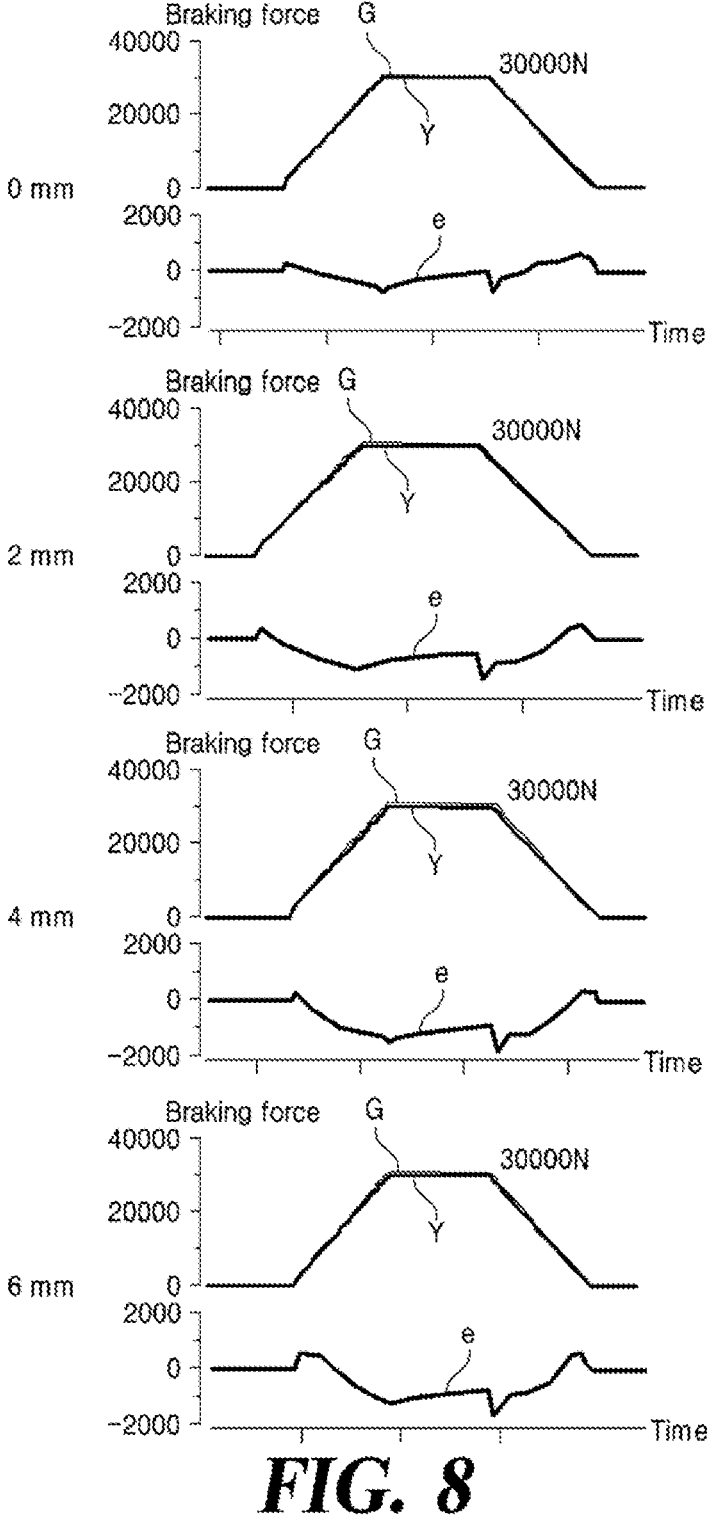
FIG. 8 is a graph showing braking force estimated by the electro-mechanical brake and braking force measured by a braking force sensor according to an embodiment of the present disclosure.

FIG. 8 is a graph showing the braking force estimated by the electro-mechanical brake and the braking force measured by the braking force sensor according to an embodiment of the present disclosure.

Referring to FIG. 8, each graph shows a case in which a wearing state of the brake pad 140 is 0 mm, 2 mm, 4 mm, and 6 mm. In each graph, G represents a case in which the braking force is measured using a braking force sensor. Y represents a case in which the braking force is estimated using the electro-mechanical brake 1 according to the present disclosure. e represents an error. Here, the error is a difference between the measured braking force and the estimated braking force. An applied maximum braking force in each graph is 30000 N. An increase rate of the braking force per hour is 15000 N/s.

It can be confirmed from the experiment that each error was within 2000 N, and the reliability of the braking force estimated by the electro-mechanical brake 1 according to the present disclosure was very high. When the braking force of 0 N to 15000 N, which is a braking range frequently used at the time of driving, was applied, the error was within 1000 N. That is, the electro-mechanical brake 1 according to the present disclosure has an effect that a braking force value close to the actual braking force value can be estimated without the braking force sensor.

Figure 9:
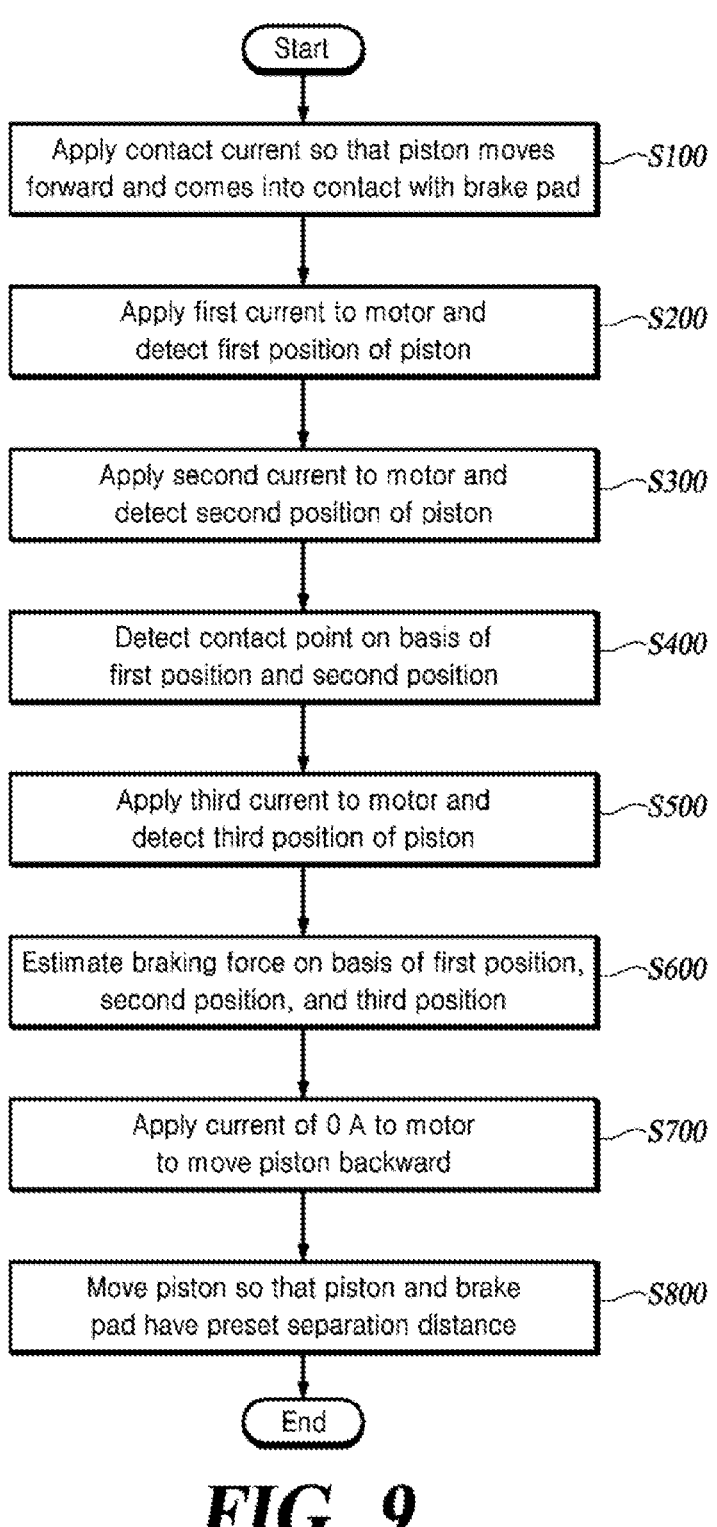
FIG. 9 is a flowchart of an operation of the electro-mechanical brake according to an embodiment of the present disclosure.

FIG. 9 is a flowchart of an operation of the electro-mechanical brake according to an embodiment of the present disclosure.

Referring to FIGS. 3 to 9, the electro-mechanical brake 1 according to the present disclosure detects the position of the piston 131. The electro-mechanical brake 1 detects the contact point CP on the basis of the position of the piston 131 and estimates the braking force.

The electro-mechanical brake 1 according to the present disclosure applies a contact current $i_0$ so that the piston 131 moves forward and comes into contact with the brake pad 140 (S100). According to an embodiment, the contact current $i_0$ may be 2 A. When the contact current $i_0$ having a smaller value is used, the RPM of the motor 120 becomes lower, and the piston 131 stops at a position closer to the contact point CP. According to an embodiment, the contact current $i_0$ may be a current when the piston 131 further moves forward a certain distance from the position at which the piston 131 comes into contact with the brake pad 140 regardless of the initial position of the piston 131 and then stops.

When the forward movement of the piston 131 due to the contact current $i_0$ ends, the electro-mechanical brake 1 applies the first current in to the motor 120 and detects the first position P1 of the piston 131. (S200). The electro-mechanical brake 1 may detect the first estimated position on the basis of the first position P1. According to an embodiment, the first current $i_1$ may be 4 A.

When the forward movement of the piston 131 due to the first current $i_1$ ends, the electro-mechanical brake 1 applies the second current $i_2$ to the motor 120 and detects the second position P2 of the piston 131 (S300). The electro-mechanical brake 1 may detect the second estimated position on the basis of the second position P2. According to an embodiment, the second current $i_2$ may be 9 A.

When the forward movement of the piston 131 by the second current $i_2$ ends, the electro-mechanical brake 1 detects the contact point CP on the basis of the first position P1 and the second position P2 (S400). According to an embodiment, the electro-mechanical brake 1 may detect the contact point CP on the basis of the first estimated position and the second estimated position. The contact point CP may be an average value of the first estimated position and the second estimated position.

When the forward movement of the piston 131 due to the second current $i_2$ ends, the electro-mechanical brake 1 applies the third current $i_3$ to the motor 120 and detects the third position P3 of the piston 131 (S500). According to an embodiment, the third current $i_3$ may be 25 A. When the forward movement of the piston 131 due to the third current $i_3$ ends, the electro-mechanical brake 1 estimates the braking force on the basis of the first position P1, the second position P2, and the third position P3 (S600).

The electro-mechanical brake 1 may generate the second force map F2 on the basis of the first position P1, the second position P2, and the third position P3 and estimate the braking force.

According to an embodiment, the electro-mechanical brake 1 may calculate a weight to correct change in stiffness of the brake pad 140. The electro-mechanical brake 1 may generate the second force map F2 on the basis of the calculated weight. The second force map F2 reflects the present condition. Using the second force map F2, the braking force corresponding to the position of the piston 131 can be estimated.

When the forward movement of the piston 131 due to the third current $i_3$ ends, the electro-mechanical brake 1 applies the fourth current $i_4$ to the motor 120 to move the piston 131 backward (S700). According to an embodiment, the fourth current $i_4$ may be 0 A. When 0 A is applied to the motor 120, a thrust caused by the motor 120 acting on the piston 131 is eliminated, and the piston 131 moves backward.

When the backward movement of the piston 131 due to the fourth current $i_4$ ends, the electro-mechanical brake 1 moves the piston 131 so that the piston 131 and the brake pad 140 have the preset separation distance (S800). According to an embodiment, the piston 131 can be located at the home position by applying the position control command.

The electro-mechanical brake 1 according to the present disclosure applies a relatively low current (4 A), a relatively high current (25 A), and an intermediate current (9 A) to the motor 120, and detects positions of the piston 131 due to the respective currents, thereby improving the accuracy of braking force estimation.

The electro-mechanical brake 1 according to the present disclosure may complete operations of S100 to S800 within 1.4 seconds.

The electro-mechanical brake 1 according to the present disclosure uses a method of directly applying the current command to the motor 120 rather than a method of estimating the contact point CP by detecting the current flowing through the motor 120. Since the electro-mechanical brake 1 according to the present disclosure directly applies the current command to the motor 120, a filter (not illustrated) is not used to remove noise of a current to be detected. In the case of a method of detecting the contact point CP by measuring the current flowing through the motor 120, a filter is used to remove noise. When the filter is used, there is a disadvantage that a delay occurs due to the filter, and a moving speed of the piston 131 must be kept constant in order to overcome this. The electro-mechanical brake 1 according to the present disclosure has an advantage that there is no limit to the moving speed of the motor 120 or the piston 131 because the electro-mechanical brake 1 does not filter a current.

The electro-mechanical brake 1 according to the present disclosure has an effect of quickly completing detection of contact point CP and the stiffness correction since the moving speed of the motor 120 is not limited.

Since the electro-mechanical brake 1 according to the present disclosure has no limit to the moving speed of the motor 120 and does not need to keep the speed of the piston 131 constant, it is possible to more quickly detect the contact point CP than a method of keeping the speed of the piston 131 constant.

The electro-mechanical brake 1 according to the present disclosure performs the detection of the contact point CP and the stiffness correction for the brake pad 140, and estimates the braking force on the basis of the same current command. Specifically, the first position P1 to the third position P3 are detected, the detection of the contact point CP and the stiffness correction are performed, and the braking force is estimated. That is, the electro-mechanical brake 1 may detect the contact point CP and perform the stiffness correction for the brake pad 140 in one operation.

The control method for the electro-mechanical brake 1 according to the present disclosure can complete the detection of the contact point CP and the stiffness correction in a shorter time as compared to a method of performing the detection of the contact point CP and the stiffness correction separately.

Since the electro-mechanical brake 1 according to the present disclosure directly applies the current command to the motor 120, there is no sudden change in current. That is, the change in current is smaller and quieter driving is possible as compared to a method of moving the piston 131 using a position control command and detecting the contact point.

What is claimed is:

1. An electro-mechanical brake comprising:
a wheel disc;
a brake pad configured to press against the wheel disc;
a piston configured to press the brake pad against the wheel disc;
a motor configured to move the piston forward or backward when a current is applied; and
a control unit configured to apply the current to the motor, detect a position of the piston, detect a contact point based on the position of the piston, and estimate braking force based on the position of the piston without using a force sensor detecting a thrust force of the piston,
wherein the contact point is a position of the piston when the piston and the brake pad start to come into contact with each other.

2. The electro-mechanical brake of claim 1, wherein:
the control unit detects the contact point based on a first position and a second position,
the first position is a position of the piston when rotation of the motor to which a first current is applied stops,
the second position is a position of the piston when rotation of the motor to which a second current is applied stops, and
the first current is lower than the second current.

3. The electro-mechanical brake of claim 2, wherein:
the contact point is detected based on a first estimated position and a second estimated position;
the first estimated position is a position of the piston when the piston moves backward by a preset distance from the first position; and
the second estimated position is a position of the piston when the piston moves backward by a preset distance from the second position.

4. The electro-mechanical brake of claim 3, wherein the contact point is an average value of the first estimated position and the second estimated position.

5. An electro-mechanical brake comprising:
a wheel disc;
a brake pad configured to press against the wheel disc;
a piston configured to press the brake pad against the wheel disc;
a motor configured to move the piston forward or backward when a current is applied; and
a control unit configured to apply the current to the motor, detect a position of the piston, detect a contact point based on the position of the piston, and estimate braking force based on the position of the piston,
wherein the contact point is a position of the piston when the piston and the brake pad start to come into contact with each other; and
wherein:
the control unit is further configured to estimate the braking force based on a first position, a second position, and a third position;
the first position is a position of the piston when rotation of the motor to which a first current is applied stops;
the second position is a position of the piston when rotation of the motor to which a second current is applied stops;
the third position is a position of the piston when rotation of the motor to which a third current is applied stops;
the first current is lower than the second current; and
the second current is lower than the third current.

6. The electro-mechanical brake of claim 5, wherein:
the control unit is configured to generate a force map based on the first position, the second position, and the third position to compensate for change in stiffness of the brake pad over time, and to estimate the braking force based on the force map; and
the force map is a map indexing a correlation between the position of the piston and the braking force.

7. The electro-mechanical brake of claim 6, wherein:
the control unit is configured to determine whether there is a change in stiffness of the brake pad by comparing a stop position of the piston due to current application in a previously stored force map with at least one of the first position, second position and third position; and
the previously stored force map is a map indexing a correlation between the position of the piston and the braking force when the brake pad is a non-wearing full pad, the contact point is a preset position, and stiffness of the brake pad has a preset value.

8. A control method for an electro-mechanical brake including a brake pad for pressing against a wheel disc, a piston for pressing the brake pad against the wheel disc, and a motor for moving the piston forward when a current is applied, the control method for an electro-mechanical brake comprising:

applying a contact current to the motor so that the piston moves forward and comes into contact with the brake pad;

applying a first current to the motor and detecting a first position of the piston when the piston stops moving forward;

applying a second current to the motor and detecting a second position of the piston when the piston stops moving forward; and detecting a contact point, the contact point being a position of the piston when the piston and the brake pad start to come into contact with each other based on the first position and the second position, wherein the first current is lower than the second current;

applying a third current to the motor and detecting a third position of the piston when the piston stops moving forward; and estimating a braking force corresponding to the position of the piston based on the first position, the second position, and the third position, wherein the third current is higher than the second current.

9. The control method for an electro-mechanical brake of claim 8, further comprising:

applying a current of zero magnitude to the motor so that the piston moves backward due to a reaction force of the brake pad; and moving the piston by applying a position control command so that the piston and the brake pad have a preset separation distance.

\* \* \* \* \*